United States Patent
Miller

(10) Patent No.: US 10,632,402 B1
(45) Date of Patent: Apr. 28, 2020

(54) SUPPORT AND DRAINAGE MATERIAL, FILTER, AND METHOD OF USE

(71) Applicant: Pall Corporation, Port Washington, NY (US)

(72) Inventor: John P. Miller, Cortland, NY (US)

(73) Assignee: PALL CORPORATION, Port Washington, NY (US)

( * ) Notice: Subject to any disclaimer, the term of this patent is extended or adjusted under 35 U.S.C. 154(b) by 6 days.

(21) Appl. No.: 16/169,622

(22) Filed: Oct. 24, 2018

(51) Int. Cl.
    *B01D 29/05* (2006.01)
    *B01D 29/56* (2006.01)
    *B01D 35/30* (2006.01)

(52) U.S. Cl.
CPC .............. *B01D 29/05* (2013.01); *B01D 29/56* (2013.01); *B01D 35/30* (2013.01); *B01D 2201/0407* (2013.01); *B01D 2201/0415* (2013.01); *B01D 2201/127* (2013.01); *B01D 2201/32* (2013.01); *B01D 2201/60* (2013.01); *B01D 2239/0618* (2013.01); *B01D 2239/0654* (2013.01)

(58) Field of Classification Search
CPC ...... B01D 27/06; B01D 29/07; B01D 29/019; B01D 29/031; B01D 29/21; B01D 29/232; B01D 29/333; B01D 29/353; B01D 46/521; B01D 46/523; B01D 2313/14; B01D 2313/143; B01D 2313/146; B01D 2201/0407; B01D 2201/0415; B01D 2201/1127
See application file for complete search history.

(56) References Cited

U.S. PATENT DOCUMENTS

| | | | |
|---|---|---|---|
| 5,263,792 A | 11/1993 | Davis et al. | |
| 5,543,047 A | 8/1996 | Stoyell et al. | |
| 5,552,048 A | 9/1996 | Miller et al. | |
| 6,045,597 A * | 4/2000 | Choi | B01D 29/012 55/483 |
| 6,786,013 B2 | 9/2004 | Coulton | |
| 2004/0060858 A1 | 4/2004 | Lucas et al. | |
| 2004/0131423 A1 | 7/2004 | Ianniello et al. | |

FOREIGN PATENT DOCUMENTS

| | | |
|---|---|---|
| EP | 2 476 474 A1 | 7/2012 |
| WO | WO 2006/074383 A2 | 7/2006 |

OTHER PUBLICATIONS

European Patent Office, Extended European Search Report in counterpart European Application No. 19201968.5, dated Mar. 6, 2020.

* cited by examiner

*Primary Examiner* — Benjamin M Kurtz
(74) *Attorney, Agent, or Firm* — Leydig Voit & Mayer, Ltd.

(57) ABSTRACT

Support and drainage materials, filter including the materials, and methods of use are disclosed.

10 Claims, 8 Drawing Sheets

SUPPORT AND DRAINAGE MATERIAL, FILTER, AND METHOD OF USE

BACKGROUND OF THE INVENTION

Support and drainage elements such as meshes (also called screens or netting) are utilized in a number of filtration applications, wherein the support and drainage ("S&D") elements are arranged upstream and/or downstream of porous filter media. The support and drainage elements have much larger openings than the pores of the filter media, and provide support to the filter media and/or provide good drainage for the filter media.

However, there is a need for improved support and drainage elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support and drainage material comprising a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; wherein the support and drainage material is suitable for use with pleated filters comprising a plurality of pleats, wherein each separate first element contacts separate pleats such that the first portion contacts one side of a pleat, and the second portion contacts another side of the pleat, and the first portion of one of the separate first elements contacts the second portion of an adjacent separate first element.

In another embodiment, a support and drainage material comprises (A) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; (i) wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; and, (B) each separate first element further comprising a second foldable layer comprising a mesh or a non-woven fabric having a first end and a second end and a fold or a hinge between the first end and the second end, the second foldable layer having a first major surface extending from the first end to the second end, and a second major surface extending from the first end to the second end, the second foldable layer having a second bulk through the second foldable layer, extending between the first major surface and the second major surface; (ii) wherein, each second layer when folded, has a length from the fold or the hinge to the first end that is greater than a length from the fold or the hinge to the second end, the length from the fold or the hinge to the first end comprising a third portion, and the length from the fold or the hinge to the second end comprising a fourth portion; (C) wherein, each separate second layer is placed in contact with respective separate first layers such that the second major surface of each separate second layer contacts the first major surface of the first layer of each respective separate first element.

An embodiment of a support and drainage material system comprises (A) a support and drainage material comprising a plurality of separate first elements, each first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; (B) a plurality of separate second elements, each second element comprising a second element first foldable layer comprising a mesh or a non-woven fabric having a first end and a second end and a fold or a hinge between the first end and the second end, the second element first foldable layer having a first major surface extending from the first end to the second end, and a second major surface extending from the first end to the second end, the second element first foldable layer having a second bulk through the second element first foldable layer, extending between the first major surface and the second major surface; wherein, each separate second element when folded, has a length from the fold or the hinge to the first end that is greater than a length from the fold or the hinge to the second end, the length from the fold or the hinge to the first end comprising a first portion, and the length from the fold or the hinge to the second end comprising a second portion; wherein the support and drainage system is suitable for use with pleated filters comprising a plurality of pleats having an upstream surface and a downstream surface, wherein (i) each separate first element contacts separate upstream surfaces of pleats such that the first portion contacts one upstream side of a pleat, and the second portion contacts another upstream side of the pleat, and the first portion of one of the separate first elements contacts the second portion of an adjacent separate first element; and, (ii) each separate second element contacts separate downstream surfaces of pleats such that the first portion contacts one downstream side of a pleat, and the second portion contacts another downstream side of the pleat, and the first portion of one of the separate second elements contacts the second portion of an adjacent separate second element.

Another embodiment of a support and drainage material system comprises a first support and drainage material and a separate second support and drainage material; (I) the first support and drainage material comprising (A) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; (i) wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; and, (B) each separate first element further comprising a second foldable layer comprising a mesh or a non-woven fabric having a first end and a second end and a fold or a hinge between the first end and the second end, the second foldable layer having a first major surface extending from the first end to the second end, and a second major surface extending from the first end to the second end, the second foldable layer having a second bulk through the second foldable layer, extending between the first major surface and the second major surface; (ii) wherein, each second layer when folded, has a length from the fold or the hinge to the first end that is greater than a length from the fold or the hinge to the second end, the length from the fold or the hinge to the first end comprising a third portion, and the length from the fold or the hinge to the second end comprising a fourth portion; (C) wherein, each second layer is placed in contact with respective separate first layers such that the second major surface of each separate second layer contacts the first major surface of the first layer of each respective separate first element; (II) the second support and drainage material comprising (D) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; (iii) wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; and, (E), each separate first element further comprising a second foldable layer comprising a mesh or a non-woven fabric having a first end and a second end and a fold or a hinge between the first end and the second end, the second foldable layer having a first major surface extending from the first end to the second end, and a second major surface extending from the first end to the second end, the second foldable layer having a second bulk through the second foldable layer, extending between the first major surface and the second major surface; (iv) wherein, each second layer when folded, has a length from the fold or the hinge to the first end that is greater than a length from the fold or the hinge to the second end, the length from the fold or the hinge to the first end comprising a third portion, and the length from the fold or the hinge to the second end comprising a fourth portion; (F) wherein, each separate second layer is placed in contact with respective separate first elements such that the second major surface of each separate second layer contacts the first major surface of the first layer of each respective separate first element; wherein the support and drainage system is suitable for use with pleated filters comprising a plurality of pleats having an upstream surface and a downstream surface, wherein (v) each separate first element of each first support and drainage material contacts separate upstream surfaces of pleats such that the first portion contacts one upstream side of a pleat, and the second portion contacts another upstream side of the pleat, and the fourth portion of one of the separate second layers contacts the third portion of an adjacent separate second layer; and, (vi) each separate first element of each second support and drainage material contacts separate downstream surfaces of pleats such that the first portion contacts one downstream side of a pleat, and the second portion contacts another downstream side of the pleat, and the fourth portion of one of the separate second layers contacts the third portion of an adjacent separate second layer.

An embodiment of a filter arrangement comprises a pleated porous filter comprising a plurality of pleats and having an upstream surface and a downstream surface; and, an embodiment of the support and drainage material arranged to contact the upstream surface of the pleated porous filter, or to contact the downstream surface of the pleated porous filter.

A filter system according to an embodiment of the invention comprises a pleated porous filter comprising a plurality of pleats and having an upstream surface and a downstream surface; and, an embodiment of the support and drainage material system, wherein (iii) each separate first element contacts separate upstream surfaces of pleats such that the first portion contacts one upstream side of a pleat, and the second portion contacts another upstream side of the pleat, and the first portion of one of the separate first elements contacts the second portion of an adjacent separate first element; and, (iv) each separate second element contacts separate downstream surfaces of pleats such that the first portion contacts one downstream side of a pleat, and the second portion contacts another downstream side of the pleat, and the first portion of one of the separate second elements contacts the second portion of an adjacent separate second element.

Another embodiment of a filter system comprises a pleated porous filter comprising a plurality of pleats having an upstream surface and a downstream surface; and an embodiment of the support and drainage material system, wherein (vii) each separate first element of each first support and drainage material contacts separate upstream surfaces of pleats such that the first portion contacts one upstream side of a pleat, and the second portion contacts another upstream side of the pleat, and the fourth portion of one of the separate second layers contacts the third portion of an adjacent separate second layers; and, (viii) each separate first element of each second support and drainage material contacts separate downstream surfaces of pleats such that the first portion contacts one downstream side of a pleat, and the second portion contacts another downstream side of the pleat, and the fourth portion of one of the separate second layers contacts the third portion of an adjacent separate second layer.

Embodiments of methods for filtering fluid are also provided by the invention.

BRIEF DESCRIPTION OF THE SEVERAL VIEWS OF THE DRAWING(S)

FIG. 1 shows a perspective view of a support and drainage material comprising a plurality of separate first elements according to an embodiment of the invention, each comprising a first foldable layer, arranged to contact pleats of a pleated filter FIG. 2 shows various diagrammatic views of an embodiment of a support and drainage system comprising folded first and second support and drainage materials shown in FIG. 1, with a pleated filter between the first and second support and drainage materials, as well as an embodiment of a filter system comprising the pleated filter between first and second support and drainage materials. FIG. 2A shows an isometric view, FIG. 2B shows a side view with arrows showing fluid flow.

FIG. 3 shows various diagrammatic views of the support and drainage system and the filter system shown in FIGS. 2A-2B, wherein the support and drainage materials are fully folded. FIG. 3A shows an embodiment of a filter system comprising a filter cartridge; and FIG. 3B shows an isometric view of the filter system without the filter cartridge cage and core.

FIG. 4 shows yet another embodiment of a filter system and an embodiment of a support and drainage material system (shown in exploded view), wherein the support and drainage material system comprises separate first and second S&D materials, each comprising a plurality of elements each comprising first and second foldable layers, arranged to contact pleats of a pleated filter, wherein each second layer is placed in contact with respective first layers such that the second major surface of each separate second layer contacts the first major surface of each respective first layer of each separate first element. FIG. 4A shows illustrative pleat height surfaces for the separate layers, and FIG. 4B shows the upstream and downstream arrangement of the elements and layers with respect to the filter pleats.

FIG. 5 shows an embodiment of an individual insert comprising a second layer contacting a first layer.

Figure 7A:
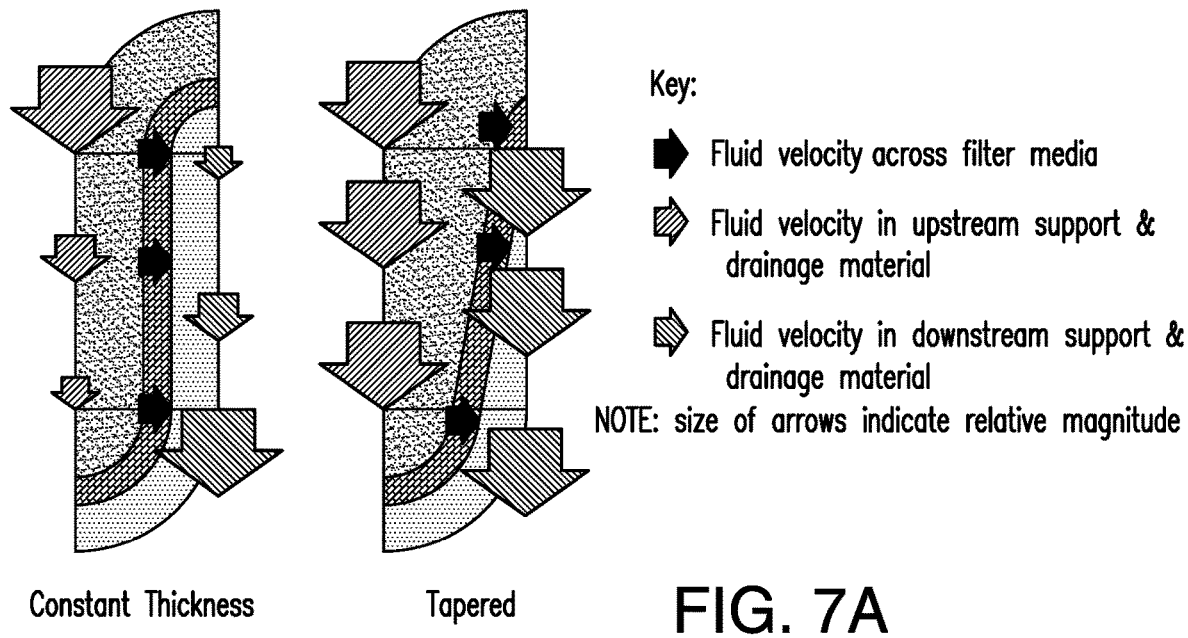
Figure 7B:
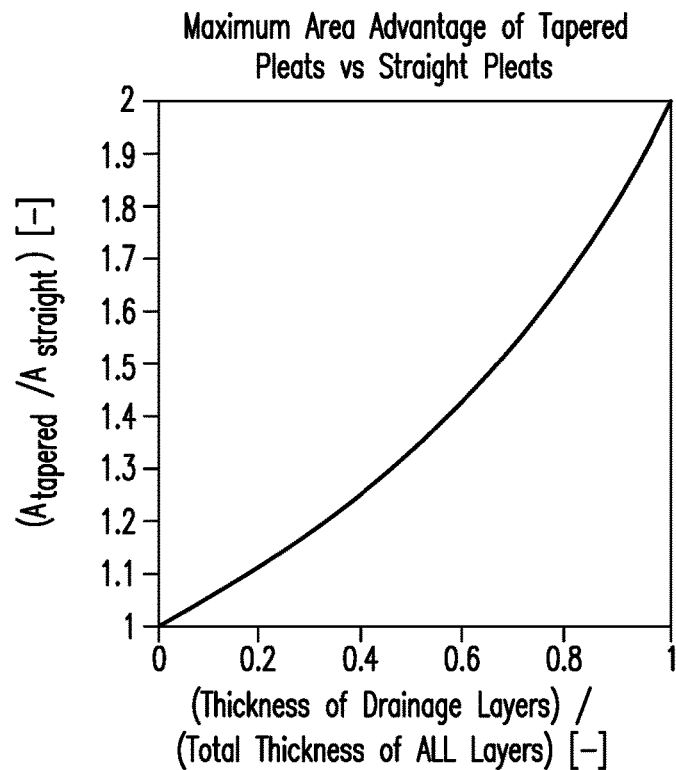

FIG. 7A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right). FIG. 7B shows the illustrative advantage in maximum filter area in a pleated filter with tapered S&D material compared to conventional constant thickness S&D material.

DETAILED DESCRIPTION OF THE INVENTION

An embodiment of the invention provides a support and drainage material comprising a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; wherein the support and drainage material is suitable for use with pleated filters comprising a plurality of pleats, wherein each separate first element contacts separate pleats such that the first portion contacts one side of a pleat, and the second portion contacts another side of the pleat, and the first portion of one of the separate first elements contacts the second portion of an adjacent separate first element.

In another embodiment, a support and drainage material comprises (A) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; (i) wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; and, (B) each separate first element further comprising a second foldable layer comprising a mesh or a non-woven fabric having a first end and a second end and a fold or a hinge between the first end and the second end, the second foldable layer having a first major surface extending from the first end to the second end, and a second major surface extending from the first end to the second end, the second foldable layer having a second bulk through the second foldable layer, extending between the first major surface and the second major surface; (ii) wherein, each second layer when folded, has a length from the fold or the hinge to the first end that is greater than a length from the fold or the hinge to the second end, the length from the fold or the hinge to the first end comprising a third portion, and the length from the fold or the hinge to the second end comprising a fourth portion; (C) wherein, each separate second layer is placed in contact with respective separate first layers such that the second major surface of each separate second layer contacts the first major surface of the first layer of each respective separate first element.

In an embodiment, the third portion of each separate second layer contacts the first portion of each respective first layer of the first element.

Alternatively, or additionally, in an embodiment of the support and drainage material, each first portion has a length at least about 15% greater than a length of each third portion.

An embodiment of a support and drainage material system comprises (A) a support and drainage material comprising a plurality of separate first elements, each first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; (B) a plurality of separate second elements, each second element comprising a second element first foldable layer comprising a mesh or a non-woven fabric having a first end and a second end and a fold or a hinge between the first end and the second end, the second element first foldable layer having a first major surface extending from the first end to the second end, and a second major surface extending from the first end to the second end, the second element first foldable layer having a second bulk through the second element first foldable layer, extending between the first major surface and the second major surface; wherein, each separate second element when folded, has a length from the fold or the hinge to the first end that is greater than a length from the fold or the hinge to the second end, the length from the fold or the hinge to the first end comprising a first portion, and the length from the fold or the hinge to the second end comprising a second portion; wherein the support and drainage system is suitable for use with pleated filters comprising a plurality of pleats having an upstream surface and a downstream surface, wherein (i) each separate first element contacts separate upstream surfaces of pleats such that the first portion contacts one upstream side of a pleat, and the second portion contacts another upstream side of the pleat, and the first portion of one of the separate first elements contacts the second portion of an adjacent separate first element; and, (ii) each separate second element contacts separate downstream surfaces of pleats such that the first portion contacts one downstream side of a pleat, and the second portion contacts another downstream side of the pleat, and the first portion of one of the separate second elements contacts the second portion of an adjacent separate second element.

Another embodiment of a support and drainage material system comprises a first support and drainage material and a separate second support and drainage material; (I) the first support and drainage material comprising (A) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; (i) wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; and, (B) each separate first element further comprising a second foldable layer comprising a mesh or a non-woven fabric having a first end and a second end and a fold or a hinge between the first end and the second end, the second foldable layer having a first major surface extending from the first end to the second end, and a second major surface extending from the first end to the second end, the second foldable layer having a second bulk through the second foldable layer, extending between the first major surface and the second major surface; (ii) wherein, each second layer when folded, has a length from the fold or the hinge to the first end that is greater than a length from the fold or the hinge to the second end, the length from the fold or the hinge to the first end comprising a third portion, and the length from the fold or the hinge to the second end comprising a fourth portion; (C) wherein, each second layer is placed in contact with respective separate first layers such that the second major surface of each separate second layer contacts the first major surface of the first layer of each respective separate first element; (II) the second support and drainage material comprising (D) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface; (iii) wherein, each separate first element when folded, has a length from the fold or the hinge to the first end that is greater than a length from the fold or the hinge to the second end, the length from the fold or the hinge to the first end comprising a first portion, and the length from the fold or the hinge to the second end comprising a second portion; and, (E), each separate first element further comprising a second foldable layer comprising a mesh or a non-woven fabric having a first end and a second end and a fold or a hinge between the first end and the second end, the second foldable layer having a first major surface extending from the first end to the second end, and a second major surface extending from the first end to the second end, the second foldable layer having a second bulk through the second foldable layer, extending between the first major surface and the second major surface; (iv) wherein, each second layer when folded, has a length from the fold or the hinge to the first end that is greater than a length from the fold or the hinge to the second end, the length from the fold or the hinge to the first end comprising a third portion, and the length from the fold or the hinge to the second end comprising a fourth portion; (F) wherein, each separate second layer is placed in contact with respective separate first elements such that the second major surface of each separate second layer contacts the first major surface of the first layer of each respective separate first element; wherein the support and drainage system is suitable for use with pleated filters comprising a plurality of pleats having an upstream surface and a downstream surface, wherein (v) each separate first element of each first support and drainage material contacts separate upstream surfaces of pleats such that the first portion contacts one upstream side of a pleat, and the second portion contacts another upstream side of the pleat, and the fourth portion of one of the separate second layers contacts the third portion of an adjacent separate second layer; and, (vi) each separate first element of each second support and drainage material contacts separate downstream surfaces of pleats such that the first portion contacts one downstream side of a pleat, and the second portion contacts another downstream side of the pleat, and the fourth portion of one of the separate second layers contacts the third portion of an adjacent separate second layer.

An embodiment of a filter arrangement comprises a pleated porous filter comprising a plurality of pleats and having an upstream surface and a downstream surface; and, an embodiment of the support and drainage material arranged to contact the upstream surface of the pleated porous filter, or to contact the downstream surface of the pleated porous filter.

Another embodiment of a filter system comprises a pleated porous filter comprising a plurality of pleats having an upstream surface and a downstream surface; and an embodiment of the support and drainage material system, wherein (vii) each separate first element of each first support and drainage material contacts separate upstream surfaces of pleats such that the first portion contacts one upstream side of a pleat, and the second portion contacts another upstream side of the pleat, and the fourth portion of one of the separate second layers contacts the third portion of an adjacent separate second layer; and, (viii) each separate first element of each second support and drainage material contacts separate downstream surfaces of pleats such that the first portion contacts one downstream side of a pleat, and the second portion contacts another downstream side of the pleat, and the fourth portion of one of the separate second layers contacts the third portion of an adjacent separate second layer.

In an embodiment of the filter system, the pleated porous filter comprises a laid-over-pleat filter. Alternatively, or additionally, in an embodiment of the filter system, the system further comprises an inner core and an outer cage.

A method of filtering fluid comprises passing a fluid through an embodiment of the filter system, including passing fluid through at least one first element, the upstream surface of the pleated porous filter, the downstream surface of the pleated porous filter, and at least one second element, or including passing fluid through the second layers and first layers of the first support and drainage material, the upstream surface of the pleated porous filter, the downstream surface of the pleated porous filter, and the first and second layers of the second support and drainage material.

Advantageously, the support and drainage materials, when placed between layers of filter media (pleated or non-pleated), provide support and uniform spacing (including reducing or preventing nesting wherein strands of mesh on opposing surfaces fit between one another rather than to lie atop one another), while exhibiting reduced edgewise flow resistance (such that the pressure drop in the support and drainage material is less than the pressure drop across the filter element), thereby providing an even distribution of fluid across the surface of the filter element and reduced face loss.

When used with a pleated filter, they can reduce filter media damage (especially membrane damage) and allow more uniform flow distribution (including flow through the pleated tip of the filter), and provide a stable pleat-pack. Additionally, support and drainage materials including hinges are compatible with conventional pleating devices.

Furthermore, when used with a pleated filter, the use of tapered materials can lead to an overall thinner pleat pitch, allowing more filter material in a given volume, while maintaining a desirable pressure differential, and improving filtration efficiency.

Moreover, in contrast with conventional constant thickness support and drainage elements, wherein the inventors have found wasted area as the local flow rate is not correlated with the needed flow area, the inventive support and drainage materials can advantageously better match the local flow rate to the needed flow area.

Illustratively, FIG. 7A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right). In contrast with conventional constant thickness S&D elements, wherein area is wasted as the local flow rate is not correlated with the needed flow area allowing velocity to vary, the inventive S&D materials can advantageously better match the local flow rate to the needed flow area keeping the velocity constant. FIG. 7B shows the illustrative advantage in maximum filter area in a pleated filter with tapered S&D material compared to conventional constant thickness S&D material, wherein "0" on the horizontal axis indicates that the S&D material is infinitesimally thin and there is no possibility of increasing the filter area by tapering the S&D material, and "1" on the horizontal axis indicates that the filter material is infinitesimally thin in which case the filter area can be increased by a factor of two. FIG. 6B suggests a maximum that can be achieved in the limit of one end of the S&D material tapering to zero thickness, real situations will fall below this curve.

The support and drainage material can be flat or planar, or substantially flat or planar, and in some embodiments, the support and drainage material is or can be curved.

Embodiments of the invention are suitable for use with a variety of filter configurations, including flat pleat filter packs, direct flow spiral filters, stacked disk filters, cross-flow cassettes, and are particularly suitable for "laid-over-pleat" (LOP) filter configurations (as described in, for example, U.S. Pat. No. 5,543,047).

Each of the components of the invention will now be described in more detail below, wherein like components have like reference numbers. Where upstream and downstream S&D materials are each illustrated with the same components, the corresponding components are identified with similar reference numbers, followed by "'", e.g., 500' corresponds to 500; 1000' corresponds to 1000, etc.

Figure 1:
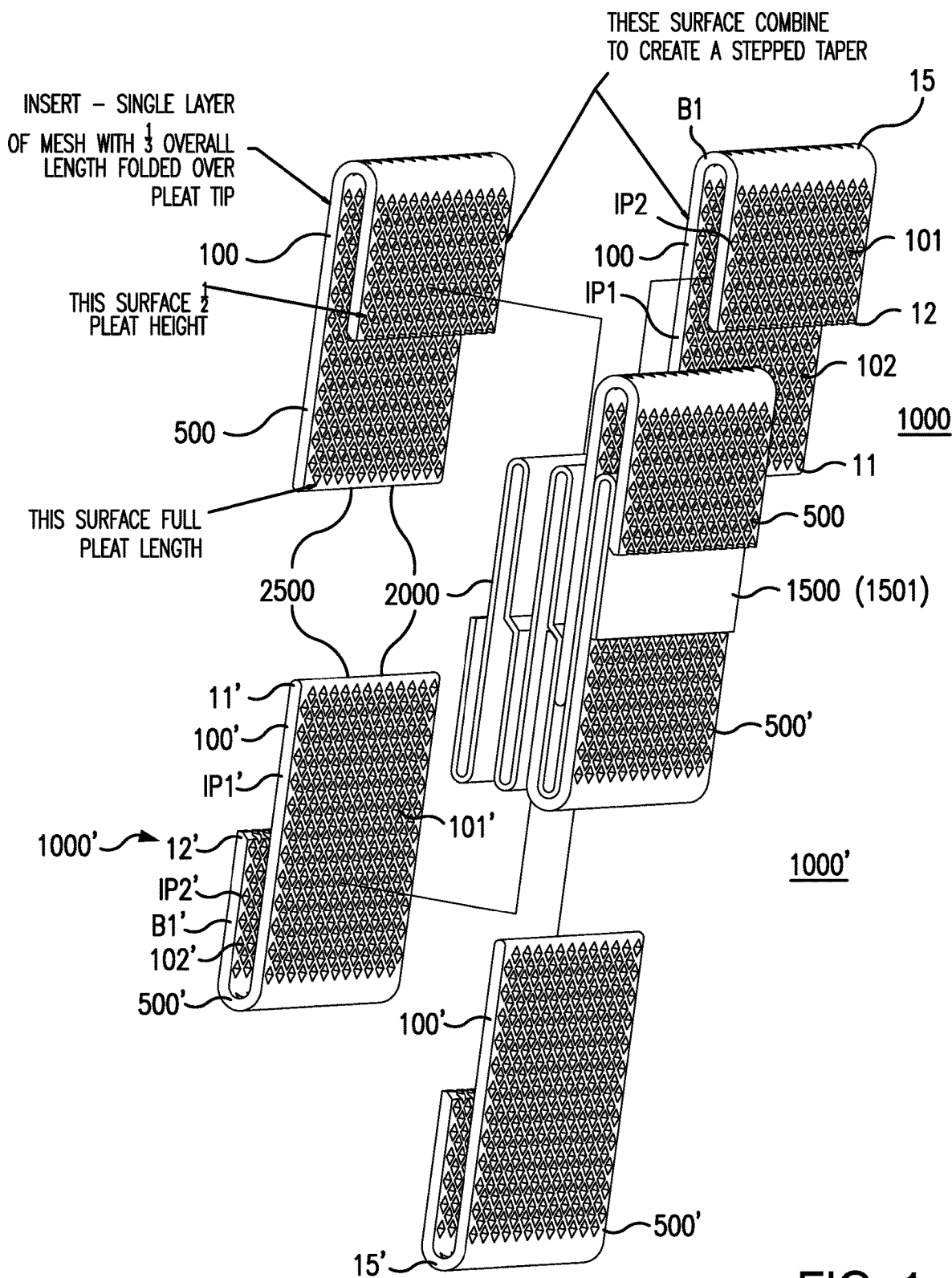

FIG. 1 shows, in exploded and partially assembled views, an embodiment of a first support and drainage material 1000 according to the invention, comprising a plurality of separate first elements (inserts) 500, each comprising a foldable layer 100, arranged to contact 2 sides of a pleat of a porous pleated filter 1500 comprising a porous pleated filter element 1501. As will be explained in more detail below, FIG. 1 also shows an embodiment of a second support and drainage material 1000' according to the invention, comprising a plurality of separate first elements 500' (downstream first elements 500' are sometimes referred to as "second elements" below), each comprising a foldable layer, arranged to contact 2 sides of a pleat of the pleated filter. The figure also shows an embodiment of a support and drainage material system 2500, comprising separate first and second support and drainage materials 1000, 1000', the first support and drainage material arranged upstream of the pleated filter, and the second support and drainage material arranged downstream of the pleated filter. An illustrated embodiment of a filter system 2000 comprises the porous pleated filter 1500 comprising a porous pleated filter element 1501 with the support and drainage materials 1000, 1000' arranged upstream and downstream of the filter.

In the embodiment shown in FIG. 1, each first element 500 comprises a first foldable layer 100 comprising a mesh or a non-woven fabric having a first end 11 and a second end 12 and a fold (or a hinge) 15 between the first end and the second end, the first foldable layer having a first major surface 101 extending from the first end to the second end, and a second major surface 102 extending from the first end to the second end, the first foldable layer having a first bulk B1 through the first foldable layer, extending between the first major surface and the second major surface; wherein, each separate first element when folded, has a length from the fold or the hinge to the first end that is greater than a length from the fold or the hinge to the second end, the length from the fold or the hinge to the first end comprising a first portion 1P1, and the length from the fold or the hinge to the second end comprising a second portion 1P2. The figure also shows the same arrangement and corresponding components for each second element 500'.

Figure 2B:
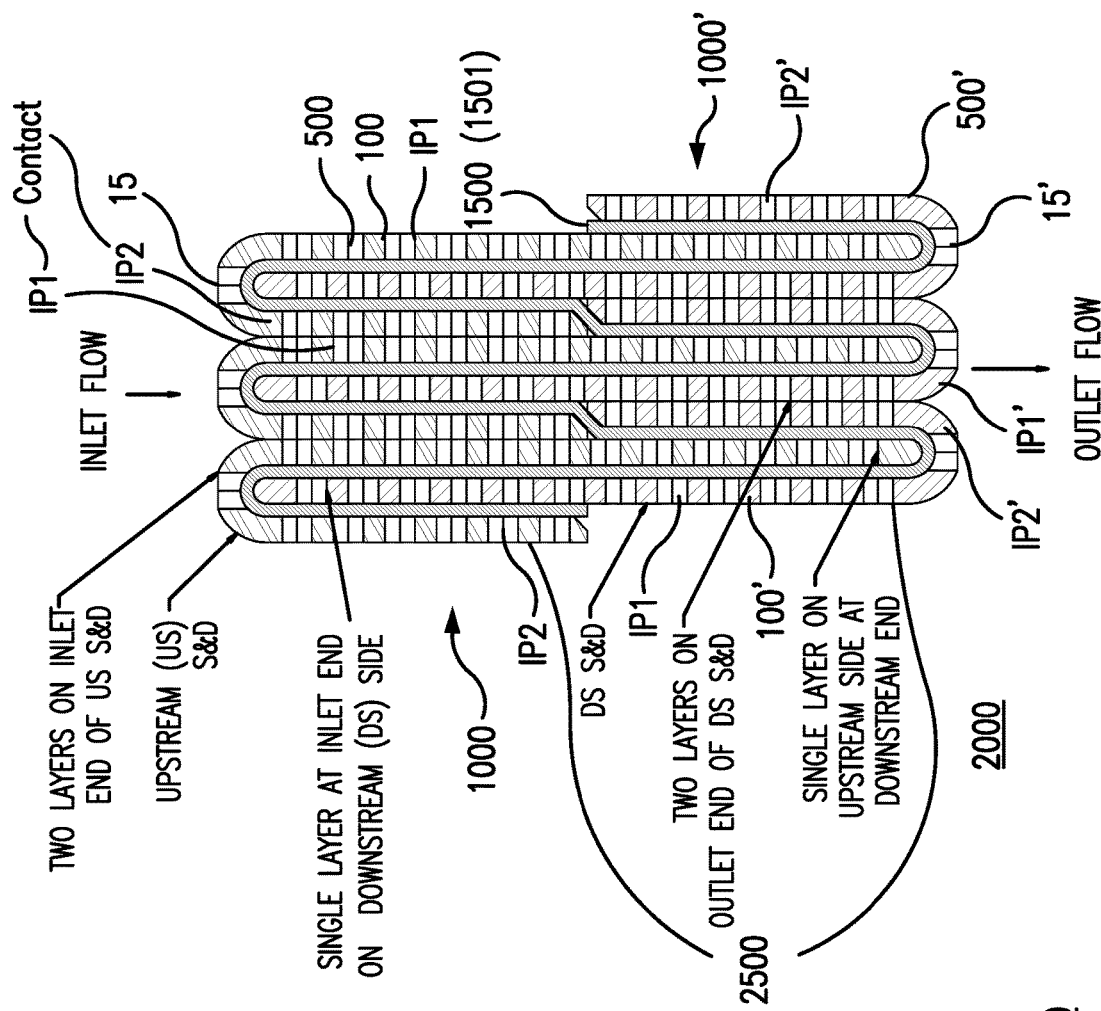
Figure 2A:
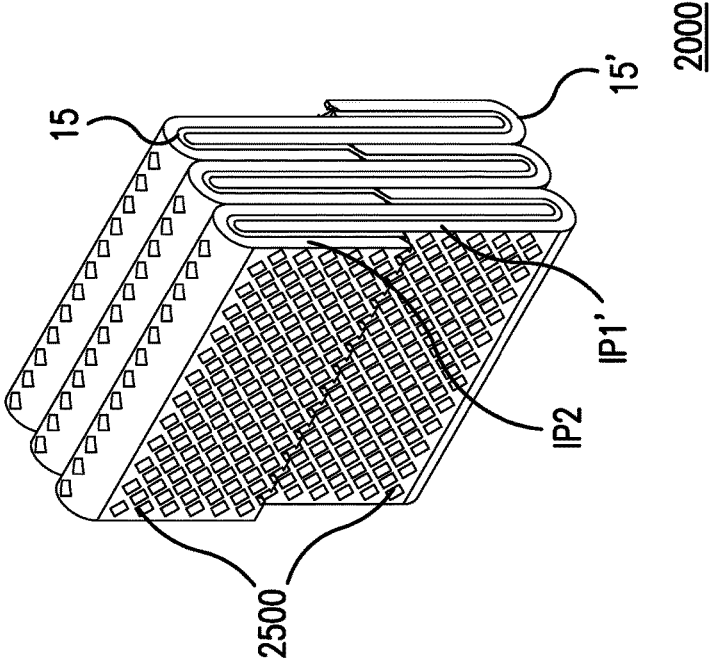

FIG. 2 shows an embodiment of an assembled support and drainage system and filter system based on FIG. 1, wherein FIG. 2A provides an isometric view and FIG. 2B provides a side view. FIG. 2B in particular shows the first support and drainage material 1000 comprising elements 500 arranged upstream of the porous pleated filter 1500 comprising a porous pleated filter element 1501, and the second support and drainage material 1000' comprising elements 500' arranged downstream of the pleated filter, wherein each separate first element 500 contacts separate upstream surfaces of pleats such that the first portion 1P1 contacts one upstream side of a pleat, and the second portion 1P2 contacts another upstream side of the pleat, and the first portion 1P1 of one of the separate first elements contacts the second portion 1P2 of an adjacent separate first element (see also, FIG. 3A); and, each separate second element 500' contacts separate downstream surfaces of pleats such that the first portion 1P1' contacts one downstream side of a pleat, and the second portion 1P2' contacts another downstream side of the pleat, and the first portion 1P1' of one of the separate second elements 500' contacts the second portion 1P2' of an adjacent separate second element. FIG. 2B also includes arrows showing fluid flow through the support and drainage system and the filter system, wherein fluid passes through the first elements, the upstream surface of the pleated porous filter, the downstream surface of the pleated porous filter, and the second elements.

FIG. 3 shows various diagrammatic views of the support and drainage system and the filter system shown in FIGS. 2A-2B, wherein the support and drainage materials are fully folded such that the sides of the support and drainage material are flush with the ends of the filter media, and sealed together to prevent flow.

Embodiments with curved or curvable support and drainage materials are particularly suitable for LOP filter configurations (as described in, for example, U.S. Pat. No. 5,543,047). For example, the filter system 2000 is illustrated in FIG. 3A as an embodiment of a filter cartridge 1600 comprising an outer cage 1610, an inner core 1611, and a porous pleated filter 1500 comprising a porous pleated filter element 1501 (with arrows showing fluid flow, also showing outer folds protecting the pleat tips of the pleated filter, and the inner folds folding in on themselves and supporting the pleat roots of the pleated filter), wherein the pleated filter has a LOP configuration, and embodiments of individual support and drainage materials (inserts) 1000, 1000', comprising elements 500, 500' as generally shown in FIGS. 2A and 2B (also applicable to the materials shown in FIGS. 4A, 4B, and 6) wherein the first support and drainage elements 500 and the second support and drainage materials 500' are rotated 180 degrees with respect to each other (providing an embodiment of a S&D element system 2500) arranged between each pleat of the pleated filter, such that both sides of each insert element contact a face of each filter pleat, and the outer tip of the respective insert contacts the inner surface of the cage or the outer surface of the inner core, spacing the pleat tip and pleat root away from the cage or core, thus protecting the pleat tip and pleat root, while allowing fluid flow therethrough.

Figures 3A, 3B:
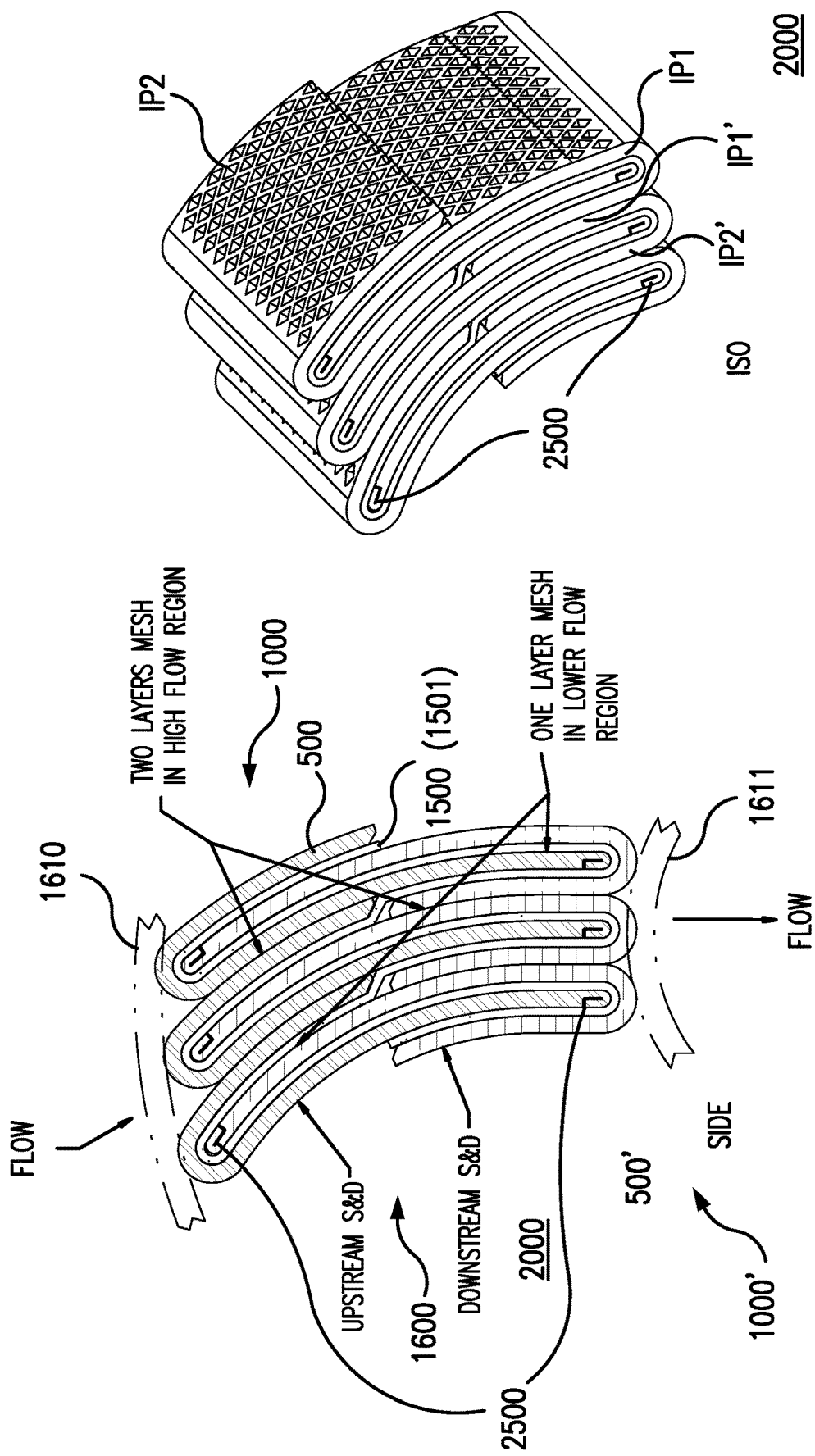

FIG. 3A also shows that adjacent S&D elements provide two layers of mesh/non-woven in a high flow region, and one layer of mesh/non-woven in a lower flow region (see also, FIGS. 2B, 7A, and 7B).

FIG. 3B shows an isometric view of the filter system and S&D system without the filter cartridge cage and core.

Figure 4A:
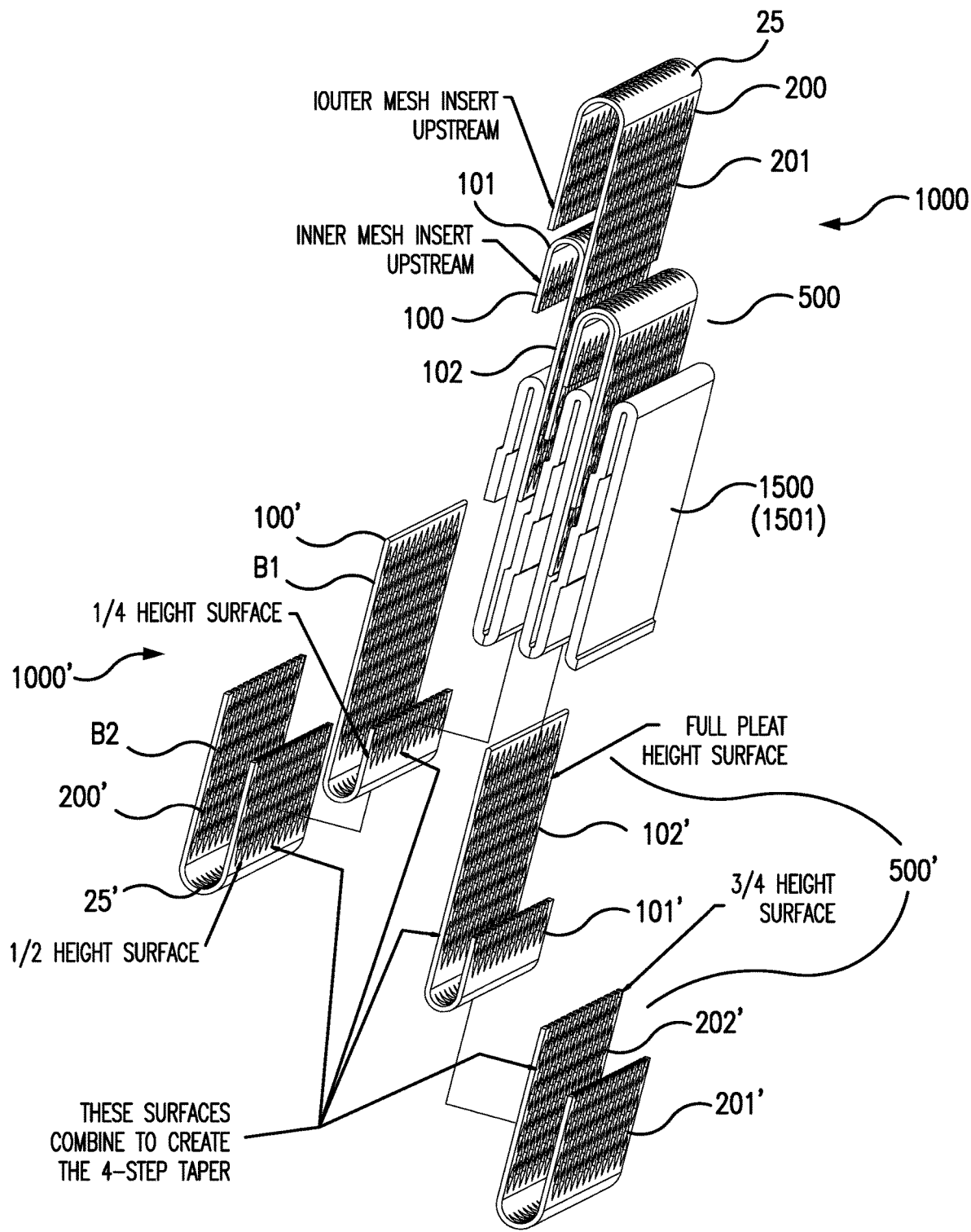
Figure 4B:
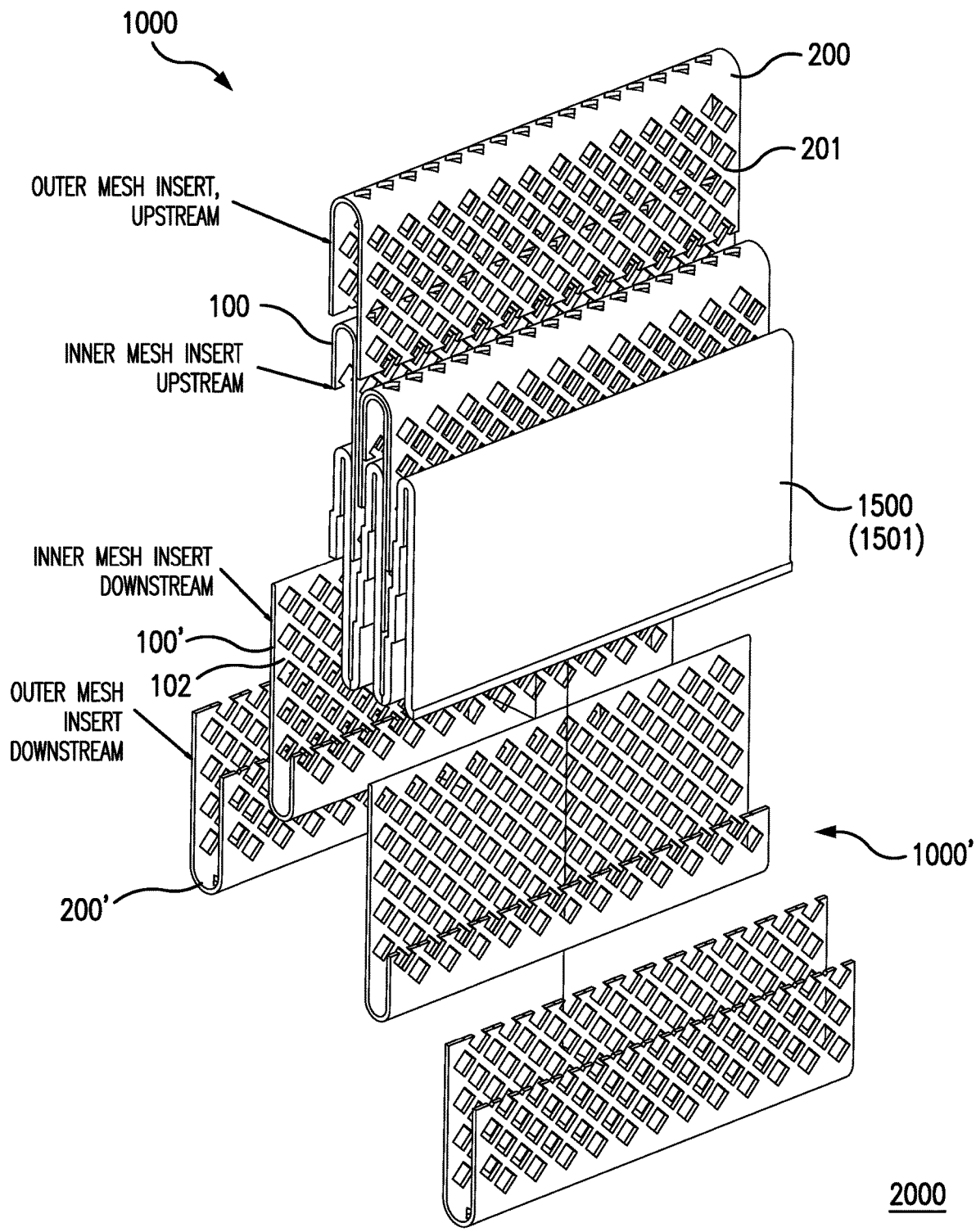

FIG. 4 shows, in exploded and partially assembled views, another embodiment of separate first and second support and drainage materials according to the invention, wherein each material comprising a first element comprising a first foldable layer and a second foldable layer. FIG. 4A shows illustrative pleat height surfaces for the separate layers, and FIG. 4B shows the upstream and downstream arrangement of the elements and layers with respect to the filter pleats.

In contrast with FIG. 1, wherein the first support and drainage material 1000 comprises a plurality of separate first elements 500 each comprising a first foldable layer 100, and the second support and drainage material 1000' comprises a plurality of separate second elements 500' each comprising a first foldable layer 100', the embodiment of the first support and drainage material 1000 shown in FIG. 4 comprises a plurality of separate first elements 500 each comprising a first foldable layer 100 and a second foldable layer 200, and the embodiment of the second support and drainage material 1000' comprises a plurality of separate second elements 500' each comprising a first foldable layer 100' and a second foldable layer 200'.

Thus, as shown in FIGS. 4A and 4B (shown in more detail in FIGS. 5A, 5B, and 6), each illustrated separate support and drainage material 1000, 1000' comprises (A) a plurality of separate first elements 500, 500' each separate first element comprising a first foldable layer 100, 100' comprising a mesh or a non-woven fabric having a first end 11, 11' and a second end 12, 12' and a fold (or a hinge) 15, 15' between the first end and the second end, the first foldable layer having a first major surface 101, 101' extending from the first end to the second end, and a second major surface 102, 102' extending from the first end to the second end, the first foldable layer having a first bulk B1, B1' through the first foldable layer, extending between the first major surface and the second major surface; (i) wherein, each separate first element when folded, has a length from the fold or the hinge to the first end that is greater than a length from the fold or the hinge to the second end, the length from the fold or the hinge to the first end comprising a first portion 1P1, 1P1', and the length from the fold or the hinge to the second end comprising a second portion 1P2, 1P2'; and, (B) each separate first element further comprising a second foldable layer 200, 200' comprising a mesh or a non-woven fabric having a first end 21, 21' and a second end and 22, 22' and a fold 25, 25' between the first end and the second end, the second foldable layer having a first major surface 201 extending from the first end to the second end, and a second major surface 202 extending from the first end to the second end, the second foldable layer having a second bulk B2, B2' through the second foldable layer, extending between the first major surface and the second major surface; (ii) wherein, each separate second layer when folded, has a length from the fold or the hinge to the first end that is greater than a length from the fold or the hinge to the second end, the length from the fold or the hinge to the first end comprising a third portion 2P3, 2P3' and the length from the fold or the hinge to the second end comprising a fourth portion 2P4, 2P4'; (C) wherein, each separate second layer is placed in contact with respective first layers such that the second major surface of each separate second layer contacts the first major surface of the first layer each respective separate first element. The first support and drainage material is arranged upstream of the pleated filter, and the second support and drainage material is arranged downstream of the pleated filter.

Figures 5A, 5B:
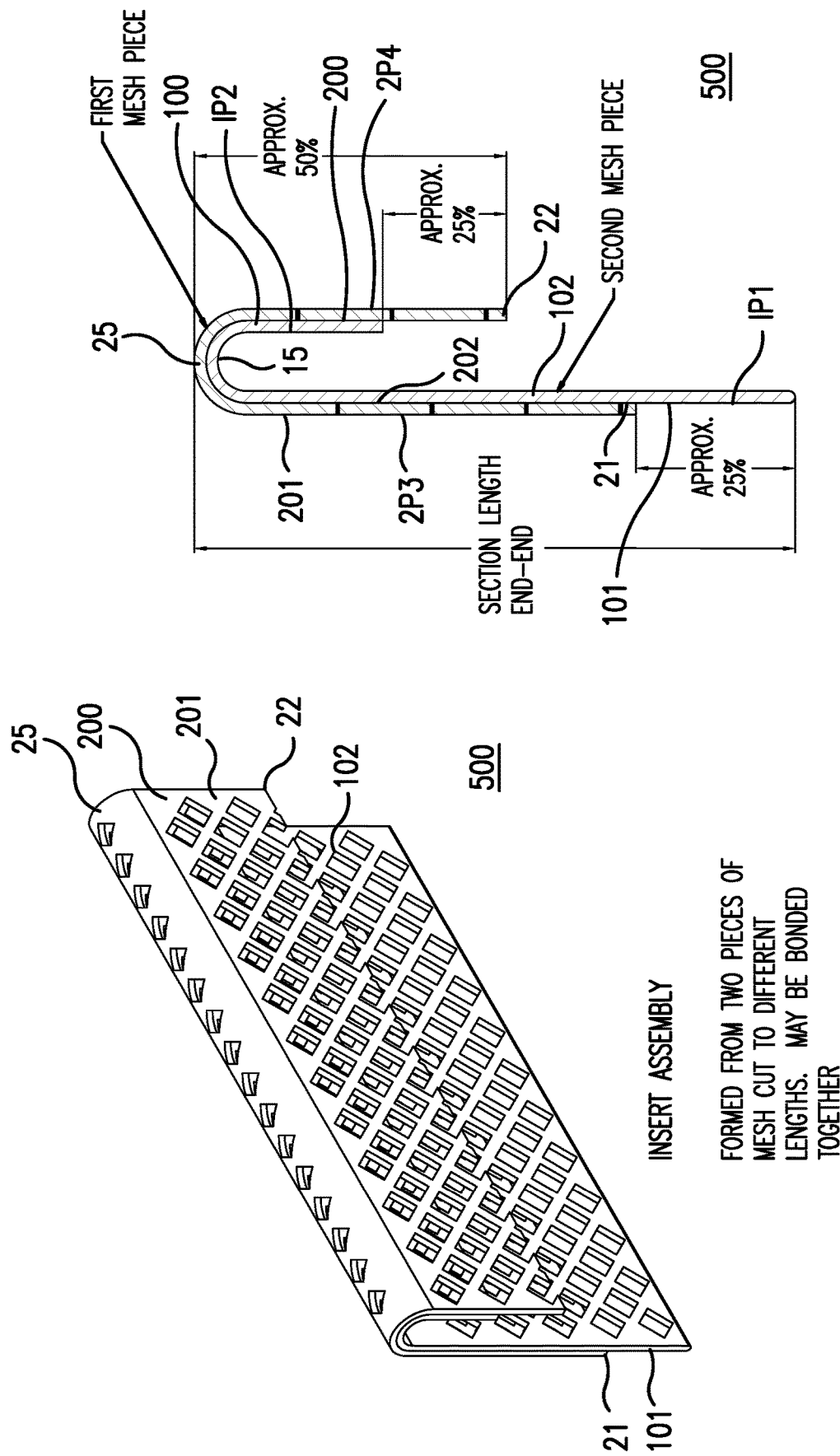
FIG. 5A shows a perspective view.
FIG. 5B shows a sectional side view.

FIG. 5 shows an embodiment of an individual insert 500 comprising an individual second layer 200 contacting an individual first layer 100. FIG. 5A shows a perspective view, and FIG. 5B shows a sectional side view, wherein the third portion 2P3 of the second layer contacts the first portion 1P1 of the first layer, and (as also shown in FIG. 4A) the first portion has a length at least about 15% greater than a length of the third portion, and portions can be provided corresponding to various pleat heights (e.g., full pleat height, 50% of the pleat height, 25% of the pleat height, etc.).

Figure 6:
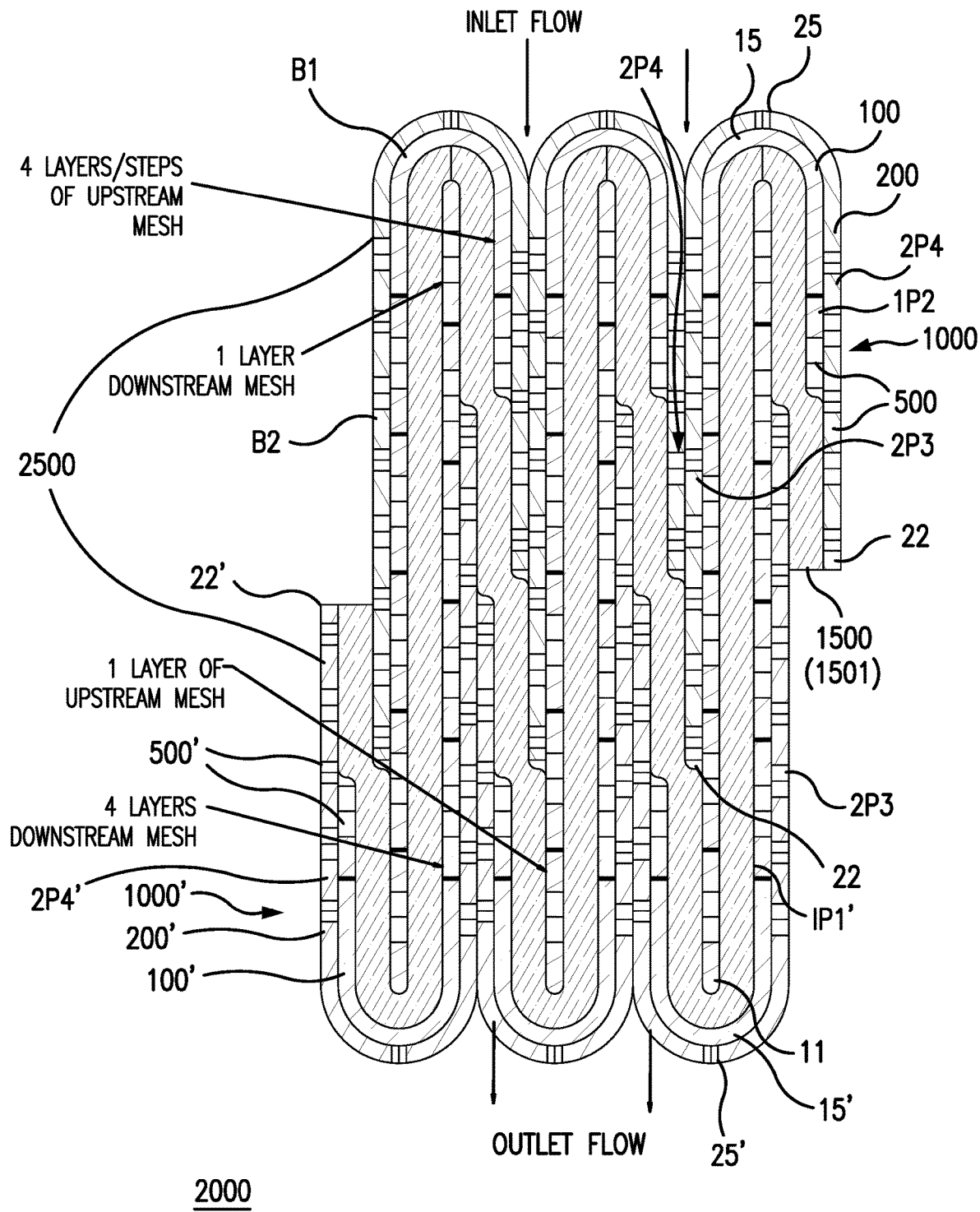
FIG. 6 shows a sectional side view of filter system and an embodiment of a support and drainage material system (with arrows showing fluid flow) including a plurality of inserts as shown in FIGS. 5A-5B.

FIG. 6 shows a sectional side view of an embodiment filter system and an embodiment of a support and drainage material system (with arrows showing fluid flow) including a plurality of inserts as shown in FIGS. 5A-5B. FIG. 6 also shows each separate first element of each first support and drainage material contacts separate upstream surfaces of pleats such that the first portion contacts one upstream side of a pleat, and the second portion contacts another upstream side of the pleat, and the fourth portion of one of the separate second layers contacts the third portion of an adjacent separate second layer; and, each separate first element of each second support and drainage material contacts separate downstream surfaces of pleats such that the first portion contacts one downstream side of a pleat, and the second portion contacts another downstream side of the pleat, and the fourth portion of one of the separate second layers contacts the third portion of an adjacent separate second layer.

As shown in, for example, FIGS. 2B, 3A, and 6, when foldable layers contact each other, this provides lengths with increased bulk thickness compared to lengths where foldable layers do not contact each other, the difference in bulk thickness providing tapered or stepped flow channels. Advantageously, in providing the tapered thickness of the bulk, this allows for more filter media area at the same level of compression as untapered standard support and drainage media.

The support and drainage materials (meshes and fabrics) can be fabricated from any suitable material which is suitable for the fluid being filtered and for the applicable filtration parameters such as temperature.

The support and drainage materials can be produced by a variety of methods known in the art, including, for example, additive manufacturing (sometimes referred to as "additive layer manufacturing" or "3D printing").

In those embodiments comprising meshes wherein the meshes are polymeric, polymeric meshes come in the form of woven meshes and extruded meshes. Either type may be employed, but extruded meshes can be preferable because they are smoother and therefore produce less abrasion of adjoining layers of the filter media. An extruded mesh may have a first set of parallel strands and a second set of parallel strands intersecting the first set of strands at an angle. Extruded meshes may be classified as either symmetrical or non-symmetrical. In a symmetrical mesh, neither of the first or second sets of strands extends in the so-called "machine direction" of the mesh, which is the direction in which the mesh emerges from the mesh manufacturing machine. In a non-symmetrical mesh, one of the sets of strands extends parallel to the machine direction. Either symmetrical or non-symmetrical meshes can be used in accordance with embodiments of the invention.

A variety of meshes are suitable for use in accordance with embodiments of the invention. For example, suitable extruded polymeric meshes include those available from Schweiter-Mauduit International Inc. (Alpharetta, Ga.) under the trade name DELNET.

Meshes can be characterized by their thickness and by the number of strands per inch. These dimensions are not limited to any particular values and can be chose in accordance with the desired edgewise flow characteristics of the mesh and the desired strength. Typically, the mesh with have a mesh count of at least about 5 strands per inch.

In those embodiments comprising non-woven fabrics wherein the fabrics are polymeric, the non-woven fabric can be fabricated from any polymeric material, including polyester, polypropylene, or polyamide (e.g., nylon) which is suitable for the fluid being filtered and for the applicable filtration parameters such as temperature.

A variety of non-woven fabrics are suitable for use in accordance with embodiments of the invention. For example suitable non-woven fabrics include polyester spunbonded non-woven fabrics available from Avintiv Technical Nonwovens (Old Hickory, Tenn.) under the trade names REEMAY (e.g., REEMAY 2011 and REEMAY 2250) and TYPAR.

Typically, the mesh or non-wovens have a thickness in the range of from about 0.0005" to about 0.025" (more typically from about 0.005" to about 0.030"), and a void fraction of about 30% or more, but thicknesses can be greater or lesser than that range, and the void fraction can be less than that value. In those embodiments wherein the mesh or non-woven is folded and/or corrugated, the mesh or non-woven is sufficiently pliable to avoid damage to the mesh or non-woven and to the filter and filter element.

A porous filter and/or a porous filter element (e.g., a porous membrane and/or a porous fibrous medium) can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

The filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction.

The filter can include additional elements, layers, or components, that can have different structures and/or functions, e.g., prefiltration upstream of the filter media and/or cushioning (cushioning upstream of the filter media for damage protection or cushioning downstream of the filter media for damage protection and/or media support).

In accordance with embodiments of the invention, the filter and/or filter element can have a variety of configurations, including planar, pleated, and hollow cylindrical.

Exemplary filters and filter elements, including pleated filters, are disclosed in U.S. Pat. Nos. 5,543,047 and 5,552,048.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support and drainage material comprising:
(A) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface;
(i) wherein, each first foldable layer when folded, has a length from the fold or the hinge to the first end that is greater than a length from the fold or the hinge to the second end, the length from the fold or the hinge to the first end comprising a first portion, and the length from the fold or the hinge to the second end comprising a second portion; and,
(B) each separate first element further comprising a second foldable layer comprising a mesh or a non-woven fabric having a first end of the second foldable layer and a second end of the second foldable layer and a fold or a hinge between the first end of the second foldable layer and the second end of the second foldable layer, the second foldable layer having a first major surface extending from the first end of the second foldable layer to the second end of the second foldable layer, and a second major surface extending from the first end of the second foldable layer to the second end of the second foldable layer, the second foldable layer having a second bulk through the second foldable layer, extending between the first major surface of the second foldable layer and the second major surface of the second foldable layer;
(ii) wherein, each second foldable layer when folded, has a length from the fold or the hinge to the first end of the second foldable layer that is greater than a length from the fold or the hinge to the second end of the second foldable layer, the length from the fold or the hinge to the first end of the second foldable layer comprising a third portion, and the length from the fold or the hinge to the second end of the second foldable layer comprising a fourth portion;
(C) wherein, each respective second foldable layer is placed in contact with a respective first foldable layer such that the second major surface of each respective second foldable layer contacts the first major surface of each respective first foldable layer.

2. The support and drainage material of claim 1, wherein the third portion of each second foldable layer contacts the first portion of the first foldable layer of each respective separate first element.

3. The support and drainage material of claim 2, wherein each first portion has a length at least about 15% greater than a length of each third portion.

4. A filter system comprising:
a pleated porous filter comprising a plurality of pleats having an upstream surface and a downstream surface; and
a support and drainage material system comprising
(A) a first support and drainage material comprising a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface;

wherein, each separate first element first foldable layer when folded, has a length from the fold or the hinge to the first end that is greater than a length from the fold or the hinge to the second end, the length from the fold or the hinge to the first end comprising a first portion, and the length from the fold or the hinge to the second end comprising a second portion; and, (B) a second support and drainage material comprising a plurality of separate second elements, each separate second element of the second support and drainage material comprising a second element first foldable layer comprising a mesh or a non-woven fabric having a first end of the second element first foldable layer and a second end of the second element first foldable layer and a fold or a hinge between the first end of the second element first foldable layer and the second end of the second element first foldable layer, the separate second element first foldable layer having a first major surface extending from the first end of the second element first foldable layer to the second end of the second element first foldable layer, and a second major surface extending from the first end of the second element first foldable layer to the second end of the second element first foldable layer, the second element first foldable layer having a second bulk through the second element first foldable layer, extending between the first major surface of the second element first foldable layer and the second major surface of the second element first foldable layer;

wherein, each second element first foldable layer of the second support and drainage material when folded, has a length from the fold or the hinge to the first end of the second element first foldable layer that is greater than a length from the fold or the hinge to the second end of the second element first foldable layer, the length from the fold or the hinge to the first end of the second element first foldable layer comprising a first portion, and the length from the fold or the hinge to the second end of the second element first foldable layer comprising a second portion; and, wherein (i) each separate first element of the first support and drainage material contacts separate upstream surfaces of pleats such that the first portion of the first foldable layer of the first support and drainage material contacts one upstream side of a pleat, and the second portion of the first foldable layer of the first support and drainage material contacts another upstream side of the pleat, and the first portion of one of the first foldable layers of a separate first element of the first support and drainage material contacts the second portion of an adjacent first foldable layer of a separate first element of the first support and drainage material; and, (ii) each separate second element of the second support and drainage material contacts separate downstream surfaces of pleats such that the first portion of the first foldable layer of the second support and drainage material contacts one downstream side of a pleat, and the second portion of the first foldable layer of the second support and drainage material contacts another downstream side of the pleat, and the first portion of one of the first foldable layers of the separate second element of the second support and drainage material contacts the second portion of an adjacent first foldable layer of a separate second element of the second support and drainage material.

5. The filter system of claim 4, wherein the pleated porous filter comprises a laid-over-pleat filter.

6. The filter system of claim 4, further comprising an inner core and an outer cage.

7. A method of filtering fluid, the method comprising passing a fluid through the filter system of claim 4, including passing fluid through the plurality of separate first elements of the first support and drainage material, the upstream surface of the pleated porous filter, the downstream surface of the pleated porous filter, and the plurality of separate second elements of the second support and drainage material.

8. A filter system comprising:
a pleated porous filter comprising a plurality of pleats having an upstream surface and a downstream surface; and
a support and drainage material system comprising a first support and drainage material and a separate second support and drainage material;
(I) the first support and drainage material comprising:
(A) a plurality of separate first elements, each separate first element comprising a first foldable layer comprising a mesh or a non-woven fabric having a first end and a second end and a fold or a hinge between the first end and the second end, the first foldable layer having a first major surface extending from the first end to the second end, and a second major surface extending from the first end to the second end, the first foldable layer having a first bulk through the first foldable layer, extending between the first major surface and the second major surface;
(i) wherein, each first foldable layer when folded, has a length from the fold or the hinge to the first end that is greater than a length from the fold or the hinge to the second end, the length from the fold or the hinge to the first end comprising a first portion, and the length from the fold or the hinge to the second end comprising a second portion; and,
(B) each separate first element of the first support and drainage material further comprising a second foldable layer comprising a mesh or a non-woven fabric having a first end of the second foldable layer and a second end of the second foldable layer and a fold or a hinge between the first end of the second foldable layer and the second end of the second foldable layer, the second foldable layer having a first major surface extending from the first end of the second foldable layer to the second end of the second foldable layer, and a second major surface extending from the first end of the second foldable layer to the second end of the second foldable layer, the second foldable layer having a second bulk through the second foldable layer, extending between the first major surface of the second foldable layer and the second major surface of the second foldable layer;
(ii) wherein, each second foldable layer when folded, has a length from the fold or the hinge to the first end of the second foldable layer that is greater than a length from the fold or the hinge to the second end of the second foldable layer, the length from the fold or the hinge to the first end of the second foldable layer comprising a third portion, and the length from the fold or the hinge to the second end of the second foldable layer comprising a fourth portion;

(C) wherein, each respective second foldable layer is placed in contact with a respective first foldable layer such that the second major surface of each respective second foldable layer contacts the first major surface of the respective first foldable layer of each respective separate first element of the first support and drainage material;

(II) the separate second support and drainage material comprising:

(D) a plurality of separate first elements of the separate second support and drainage material, each separate first element of the separate second support and drainage material comprising a first foldable layer comprising a mesh or a non-woven fabric having a first end of the first foldable layer of the separate second support and drainage material and a second end of the first foldable layer of the separate second support and drainage material and a fold or a hinge between the first end of the first foldable layer of the separate second support and drainage material and the second end of the first foldable layer of the separate second support and drainage material, the first foldable layer of the separate second support and drainage material having a first major surface extending from the first end of the first foldable layer of the separate second support and drainage material to the second end of the first foldable layer of the separate second support and drainage material, and a second major surface of the first foldable layer of the separate second support and drainage material extending from the first end of the first foldable layer of the separate second support and drainage material to the second end of the first foldable layer of the separate second support and drainage material, the first foldable layer having a first bulk through the first foldable layer of the separate second support and drainage material, extending between the first major surface of the first foldable layer of the separate second support and drainage material and the second major surface of the first foldable layer of the separate second support and drainage material;

(iii) wherein, each first foldable layer of the separate second support and drainage material when folded, has a length from the fold or the hinge to the first end of the first foldable layer of the separate second support and drainage material that is greater than a length from the fold or the hinge to the second end of the first foldable layer of the separate second support and drainage material, the length from the fold or the hinge to the first end of the first foldable layer of the separate second support and drainage material comprising a first portion, and the length from the fold or the hinge to the second end of the first foldable layer of the separate second support and drainage material comprising a second portion; and, (E) each separate first element of the separate second support and drainage material further comprising a second foldable layer comprising a mesh or a non-woven fabric having a first end of the second foldable layer of the separate second support and drainage material and a second end of the second foldable layer of the separate second support and drainage material and a fold or a hinge between the first end of the second foldable layer of the separate second support and drainage material and the second end of the second foldable layer of the separate second support and drainage material, the second foldable layer having a first major surface extending from the first end of the second foldable layer of the separate second support and drainage material to the second end of the second foldable layer of the separate second support and drainage material, and a second major surface extending from the first end of the second foldable layer of the separate second support and drainage material to the second end of the second foldable layer of the separate second support and drainage material, the second foldable layer of the separate second support and drainage material having a second bulk through the second foldable layer, extending between the first major surface of the second foldable layer of the separate second support and drainage material and the second major surface of the second foldable layer of the separate second support and drainage material;

(iv) wherein, each second foldable layer of the separate second support and drainage material when folded, has a length from the fold or the hinge to the first end of the second foldable layer of the separate second support and drainage material that is greater than a length from the fold or the hinge to the second end of the second foldable layer of the separate second support and drainage material, the length from the fold or the hinge to the first end of the second foldable layer of the separate second support and drainage material comprising a third portion, and the length from the fold or the hinge to the second end of the second foldable layer of the separate second support and drainage material comprising a fourth portion;

(F) wherein, each respective second foldable layer of the separate second support and drainage material is placed in contact with respective first foldable layers of the separate second support and drainage material such that the second major surface of each respective second foldable layer of the separate second support and drainage material contacts the first major surface of each respective first foldable layer of each respective separate first element of the separate second support and drainage material; and, wherein (v) each separate first element of the first support and drainage material contacts separate upstream surfaces of pleats such that the first portion of the first foldable layer of the first element of the first support and drainage material contacts one upstream side of a pleat, and the second portion of the first foldable layer of the first element of the first support and drainage material contacts another upstream side of the pleat, and the fourth portion of one of the second foldable layers of the first element of the first support and drainage material contacts the third portion of an adjacent separate second foldable layer of the first support and drainage material; and, (vi) each separate first element of the separate second support and drainage material contacts separate downstream surfaces of pleats such that the first portion of the first foldable layer of the separate second support and drainage material contacts one downstream side of a pleat, and the second portion of the first foldable layer of the separate second support and drainage material contacts another downstream side of the pleat, and the fourth portion of one of the second foldable layers of the first element of the separate second support and drainage material contacts the third portion of an adjacent separate second foldable layer of the separate second support and drainage material.

9. A method of filtering fluid, the method comprising passing a fluid through the filter system of claim 8, including passing fluid through a separate first element second foldable layer and a separate first element first foldable layer of the first support and drainage material, the upstream surface of the pleated porous filter, the downstream surface of the pleated porous filter, and a first foldable layer and a second foldable layer of the separate second support and drainage material.

10. The filter system of claim 8, wherein the pleated porous filter comprises a laid-over-pleat filter.

\* \* \* \* \*